US012357429B2

(12) United States Patent
Sato et al.

(10) Patent No.: US 12,357,429 B2
(45) Date of Patent: Jul. 15, 2025

(54) METHODS OF FORMING ORTHODONTIC DEVICES WITH PALATAL ANCHORAGE

(71) Applicant: Align Technology, Inc., San Jose, CA (US)

(72) Inventors: Jun Sato, San Jose, CA (US); Ryan Kimura, San Jose, CA (US); Yaser Shanjani, Milpitas, CA (US); Ken Wu, San Jose, CA (US); Bastien Pesenti, San Jose, CA (US); Bruce Cam, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 309 days.

(21) Appl. No.: 17/893,069

(22) Filed: Aug. 22, 2022

(65) Prior Publication Data

US 2022/0409343 A1    Dec. 29, 2022

Related U.S. Application Data

(63) Continuation of application No. 16/041,606, filed on Jul. 20, 2018, now Pat. No. 11,419,702.

(60) Provisional application No. 62/535,751, filed on Jul. 21, 2017.

(51) Int. Cl.
| | |
|---|---|
| *A61C 7/08* | (2006.01) |
| *A61C 7/00* | (2006.01) |
| *A61C 7/10* | (2006.01) |
| *A61C 7/14* | (2006.01) |
| *A61C 8/00* | (2006.01) |

(52) U.S. Cl.
CPC .............. *A61C 7/08* (2013.01); *A61C 7/002* (2013.01); *A61C 7/10* (2013.01); *A61C 7/14* (2013.01); *A61C 8/0096* (2013.01)

(58) Field of Classification Search
None
See application file for complete search history.

(56) References Cited

U.S. PATENT DOCUMENTS

| | | |
|---|---|---|
| 5,820,368 A | 10/1998 | Wolk |
| 5,967,772 A | 10/1999 | Gray |
| 6,386,864 B1 | 5/2002 | Kuo |
| 6,783,604 B2 | 8/2004 | Tricca |
| 6,790,035 B2 | 9/2004 | Tricca et al. |
| 6,947,038 B1 | 9/2005 | Anh et al. |
| 7,104,792 B2 | 9/2006 | Taub et al. |
| 7,160,107 B2 | 1/2007 | Kopelman et al. |

(Continued)

*Primary Examiner* — Heidi M Eide
(74) *Attorney, Agent, or Firm* — Shay Glenn LLP (57) ABSTRACT

Methods of fabricating orthodontic alignment devices. First forces may be applied to teeth of a digital model to simulate movement of the teeth from one stage of an ordered sequence of stages to a next stage. The first forces may include one or more unwanted forces that move one or more teeth of the digital model in an unwanted direction. One or more forces may be applied to the palate of the digital model that results in second forces applied to the teeth of the digital model to replace or offset the one or more unwanted forces. A shape for the orthodontic alignment device may be determined based on the first and second forces applied to the teeth and in combination with the one or more forces applied to the palate of the digital model. An orthodontic alignment device may be fabricated based on the determined shape.

20 Claims, 6 Drawing Sheets

(56) References Cited

U.S. PATENT DOCUMENTS

| | | |
|---|---|---|
| 7,448,514 B2 | 11/2008 | Wen |
| 7,600,999 B2 | 10/2009 | Knopp |
| 7,766,658 B2 | 8/2010 | Tricca et al. |
| 7,771,195 B2 | 8/2010 | Knopp et al. |
| 7,871,269 B2 | 1/2011 | Wu et al. |
| 7,883,334 B2 | 2/2011 | Li et al. |
| 7,914,283 B2 | 3/2011 | Kuo |
| 8,235,715 B2 | 8/2012 | Kuo |
| 8,337,199 B2 | 12/2012 | Wen |
| 8,401,686 B2 | 3/2013 | Moss et al. |
| 8,684,729 B2 | 4/2014 | Wen |
| 8,758,009 B2 | 6/2014 | Chen et al. |
| 9,119,691 B2 | 9/2015 | Namiranian et al. |
| 9,326,831 B2 | 5/2016 | Cheang |
| 9,655,691 B2 | 5/2017 | Li et al. |
| 9,700,385 B2 | 7/2017 | Webber |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,363,116 B2 | 7/2019 | Boronkay |
| D865,180 S | 10/2019 | Bauer et al. |
| 10,463,452 B2 | 11/2019 | Matov et al. |
| 10,492,888 B2 | 12/2019 | Chen et al. |
| 10,517,701 B2 | 12/2019 | Boronkay |
| 10,537,463 B2 | 1/2020 | Kopelman |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,881,487 B2 | 1/2021 | Cam et al. |
| 10,912,629 B2 | 2/2021 | Tanugula et al. |
| 11,045,283 B2 | 6/2021 | Riley et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,419,710 B2 | 8/2022 | Mason et al. |
| 11,471,253 B2 | 10/2022 | Venkatasanthanam et al. |
| 11,497,586 B2 | 11/2022 | Kopelman |
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 2004/0166462 A1 | 8/2004 | Phan et al. |
| 2005/0014105 A1 | 1/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | DeSimone et al. |
| 2006/0115782 A1 | 6/2006 | Li et al. |
| 2006/0199142 A1 | 9/2006 | Liu et al. |
| 2007/0031774 A1* | 2/2007 | Cinader, Jr. .............. A61C 7/00 433/213 |
| 2008/0160473 A1 | 7/2008 | Li et al. |
| 2008/0286716 A1 | 11/2008 | Sherwood |
| 2008/0286717 A1 | 11/2008 | Sherwood |
| 2009/0191502 A1* | 7/2009 | Cao .......................... A61C 7/08 433/24 |
| 2009/0280450 A1 | 11/2009 | Kuo |
| 2010/0055635 A1 | 3/2010 | Kakavand |
| 2010/0129763 A1 | 5/2010 | Kuo |
| 2010/0138025 A1* | 6/2010 | Morton ..................... A61C 7/00 700/103 |
| 2014/0067334 A1 | 3/2014 | Kuo |
| 2015/0366638 A1 | 12/2015 | Kopelman et al. |
| 2016/0193014 A1 | 7/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2018/0360567 A1 | 12/2018 | Xue et al. |
| 2019/0000592 A1 | 1/2019 | Cam et al. |
| 2019/0000593 A1 | 1/2019 | Cam et al. |
| 2019/0099129 A1 | 4/2019 | Kopelman et al. |
| 2019/0125497 A1 | 5/2019 | Derakhshan et al. |
| 2019/0175304 A1 | 6/2019 | Morton et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2020/0000553 A1 | 1/2020 | Makarenkova et al. |
| 2020/0100864 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0147672 A1 | 5/2021 | Cole et al. |

\* cited by examiner

FIG. 15

METHODS OF FORMING ORTHODONTIC DEVICES WITH PALATAL ANCHORAGE

CROSS REFERENCE TO RELATED APPLICATIONS

This application is a continuation of U.S. patent application Ser. No. 16/041,606, filed Jul. 20, 2018, titled "PALATAL CONTOUR ANCHORAGE," now U.S. Pat. No. 11,419,702, which claims priority to U.S. Provisional Patent Application No. 62/535,751, filed Jul. 21, 2017, titled "PALATAL CONTOUR ANCHORAGE," each of which is herein incorporated by reference in its entirety for all purposes.

INCORPORATION BY REFERENCE

All publications and patent applications mentioned in this specification are herein incorporated by reference to the same extent as if each individual publication or patent application was specifically and individually indicated to be incorporated by reference.

FIELD

Embodiments of the invention relate generally to dental appliances for manipulating teeth, and more generally to dental appliances that exert forces on both the teeth and palate and/or gingiva to manipulate teeth.

BACKGROUND

Many dental treatments involve repositioning misaligned teeth and changing bite configurations for improved cosmetic appearance and dental function. Orthodontic repositioning can be accomplished, for example, by applying controlled forces to one or more teeth over a period of time.

An example of orthodontic repositioning that can occur through a dental process uses one or more positioning dental appliances, such as aligners, for realigning teeth. Placement of an appliance over the teeth can provide controlled forces in specific locations to gradually move the teeth into a new configuration. Repetition of this process with successive appliances in progressive configurations can move the teeth through a series of intermediate arrangements to a final desired arrangement.

It would be desirable to provide for a dental appliance that moves the teeth to the position of the next progressive segment while reducing unwanted teeth movement.

SUMMARY OF THE DISCLOSURE

The present invention relates generally to dental appliances for manipulating teeth, and more generally to dental appliances that exert forces on both the teeth and palate and/or gingiva to manipulate teeth.

Any of the methods and apparatuses described herein may include both a tooth-contacting portion (e.g., a tooth portion or tooth receiving portion) that applies forces to the teeth received therein, and an anchorage portion that exerts a reaction force on the at least one portion of the gingiva and/or palate within the patient's mouth that balances at least in part the force applied to the patient's tooth or teeth by the tooth portion.

For example, described herein are orthodontic alignment devices that include: a tooth portion having a dentition-receiving cavity configured to be placed over one or more of the patient's teeth, the tooth portion configured to contact one or more predetermined surfaces of one or more of the patient's teeth when the tooth portion is placed over the one or more of the patient's teeth; and an anchorage portion extending from the tooth portion, the anchorage portion having a contour that matches a surface contour of at least one portion of the gingiva and/or palate within the patient's mouth, wherein the portion of the gingiva and/or palate within the patient's mouth is selected from the group consisting of: the hard palate, the soft palate, the buccal gingiva, and the lingual gingiva; wherein the anchorage portion is configured to exert a reaction force on the at least one portion of the gingiva and/or palate within the patient's mouth that balances at least in part the force applied to the patient's tooth or teeth by the tooth portion when the tooth portion is placed over one or more of the patient's teeth.

In general, the anchorage portion may be configured to disperse the reaction force so that the amount of force applied to any discrete portion of the gingiva and/or palate is limited below a threshold, which may prevent damage (including necrosis) to these tissues when the apparatus is worn for an extended period. On the aggregate, however, the force applied by the anchorage portion may be large, and sufficient to balance the force applied by the tooth portion. For example, the anchorage portion may have a surface area sufficiently large to disperse the reaction force such that the anchorage portion is configured to exert less than a predetermined amount of pressure against the gingiva and/or palate.

Thus, in general, the predetermined amount of pressure (and/or predetermined amount of force) may be a force and/or a pressure that causes tissue damage to the gingiva and/or palate within the patient's mouth (or the threshold force and/or pressure, above which damage may result). Tissue damage may be capillary damage, desquamation, necrosis, etc.

The contour of the anchorage portion may generally match at least partially the surface contour of a portion of the hard palate and/or gingiva. For example, the contour of the anchorage portion may match the surface contour of a portion of the buccal gingiva. The contour of the anchorage portion may match the surface contour of a portion of the lingual gingiva.

Any of the apparatuses described herein may also be used with one or more additional anchorage or securing devices, including, but not limited to temporary anchorage devices (TADs). For example, the anchorage portion may include a temporary anchorage device receptacle for receiving a portion of an implanted temporary anchorage device.

As mentioned, the tooth portion may comprise one or more anchor receptacles configured to receive anchors that have been attached to one or more of the patient's teeth.

Also described herein are methods for moving one or more teeth of a patient using any of the orthodontic alignment device described herein. For example, a method of moving one or more teeth of a patient may include: placing a tooth region of the orthodontic alignment device over one or more teeth of the patient, wherein the tooth region comprises a concave surface for receiving one or more teeth of the patient, further wherein the orthodontic alignment device comprises an anchor portion extending from the tooth region and matches the patient's palate; exerting, with the tooth portion, one or more forces on one or more teeth of the patient; exerting, with the anchor portion, a reaction force against a portion of the patient's gingiva and/or palate that balances at least in part the one or more forces exerted by the tooth portion, wherein the patient's gingiva and/or palate is selected from the group consisting of the hard palate, the soft palate, the buccal gingiva, and the lingual gingiva; and moving one or more teeth of the patient.

In any of these methods, the method may include dispersing the reaction force over a sufficiently large surface are of the patient's gingiva and/or palate to avoid or reduce damage to the patient's gingiva and/or palate.

The step of exerting with the orthodontic alignment device one or more forces may include exerting a distalizing force configured to move one or more teeth in a distal direction. The reaction force may be exerted against the hard palate. The step of exerting, with the orthodontic alignment device, one or more forces may include exerting a rotation force on a tooth that is configured to rotate the tooth. The reaction force may be exerted against the lingual gingiva or the buccal gingiva. The step of exerting with the orthodontic alignment device one or more forces may include exerting an extrusion force on one or more teeth. The reaction force may be exerted against the hard palate. Alternatively or additionally, the reaction force may be applied to hard palate to push one or more anterior teeth outwards.

The step of exerting with the orthodontic alignment device one or more forces may include exerting a tipping force on one or more teeth.

In some variations, the one or more forces exerted by the orthodontic alignment device on the patient's teeth along with the reaction force may function to pull the patient's upper jaw forward.

Also described herein are methods of fabricating any of the orthodontic alignment devices described herein. For example a method of fabricating an orthodontic aligner device may include: receiving data comprising a three-dimensional representation of a patient's teeth, gingiva, and palate within the patient's mouth; generating a model of the patient's teeth, gingiva, and palate within the patient's mouth using the received data; determining a force that is applied to one or more teeth for moving one or more teeth in a desired direction based on the generated model of the patient's teeth; determining a reaction force that is applied to one or more locations on the gingiva and/or palate within the patient's mouth for balancing the force that is applied to the one or more teeth based on the determined force that is applied to the one or more teeth and the generated model of the patient's teeth, gingiva, and palate within the patient's mouth; determining a shape for the orthodontic alignment device based on the generated model of the patient's teeth, gingiva, and palate within the patient's mouth, the determined force that is applied to the one or more teeth, and the determined reaction force that is applied to one or more locations on the gingiva and/or palate within the patient's mouth; and fabricating the orthodontic alignment device based on the determined shape.

For example, a method for fabricating an orthodontic alignment device may include: generating a digital model of the patient's teeth and palate and/or gingiva within the patient's mouth, wherein each tooth is a separate object that can be independently moved in the digital model, wherein the palate and/or gingiva is also a separate object; generating an ordered sequence of stages of teeth position, wherein the ordered sequence of stages includes a stage for an initial position of the teeth, a plurality of stages for a plurality of intermediate positions of the teeth, and a stage for a final position of the teeth; determining a first plurality of forces that can be applied to the teeth by a teeth alignment device to move the teeth from one stage to the next stage; determining whether the first plurality of forces that can be applied to the teeth by the orthodontic alignment device to move the teeth from one stage to the next stage includes one or more forces that move one or more teeth in an unwanted direction; if the first plurality of forces includes one or more forces that move one or more teeth in an unwanted direction, determining whether an application of one or more forces to the palate and/or gingiva by the orthodontic alignment device can be used to replace or offset the one or more forces that move one or more teeth in an unwanted direction and result in a second plurality of forces that can be applied to the teeth in combination with one or more forces applied to the palate and/or gingiva; determine a shape for the orthodontic alignment device based on the first plurality of forces applied to the teeth by the orthodontic alignment device or the second plurality of forces applied to the teeth in combination with one or more forces applied to the palate and/or gingiva; and fabricating the orthodontic alignment device based on the determined shape to move the teeth from one stage to the next stage.

Any of these methods may also include determining a level of pressure applied to the palate and/or gingiva by the orthodontic alignment device when the orthodontic alignment device is worn by the patient. For example the method may include modifying the shape of the orthodontic alignment device when the determined level of pressure applied to the palate and/or gingiva by the orthodontic alignment device exceeds a set or predetermined level, wherein the modified shape of the orthodontic alignment device reduces the level of pressure applied to the palate and/or gingiva below the set or predetermined level.

Modifying the shape of the orthodontic alignment device may include increasing a size of a portion of the orthodontic alignment device configured to contact the palate and/or gingiva.

The method may also include fabricating a series of orthodontic alignment devices to sequentially move the teeth from the stage for the initial position of the teeth to the stage for the final position of the teeth.

In any of the devices and methods described herein, the predetermined amount of pressure may be a pressure that causes pain to the gingiva and/or palate within the patient's mouth.

For example, in some embodiments, the predetermined amount of pressure may be less than 5 to 90 MPa. In other embodiments, the predetermined amount of pressure may be less than 200 to 1500 gram-force/square mm.

In any of the devices and methods described herein, the predetermined amount of pressure may be a pressure that is typically applied to the palatal tissues by dentures. For example, the pressure may be up to about 4 to 350 kPa.

Also described herein are orthodontic alignment systems that include: a plurality of dental appliances that are configured to be applied sequentially to a patient's dentition and gingiva and/or palate, each dental appliance comprising: a tooth portion having a dentition-receiving cavity configured to be placed over one or more of the patient's teeth, the tooth portion configured to contact one or more predetermined surfaces of one or more of the patient's teeth; and an anchorage portion extending from the tooth portion and configured to abut at least one portion of the patient's gingiva and/or palate within the patient's mouth, where the portion of the gingiva and/or palate within the patient's mouth is selected from the group consisting of: the hard palate, the soft palate, the buccal gingiva, and the lingual gingiva; where the anchorage portion is configured to exert a reaction force on the at least one portion of the gingiva and/or palate within the patient's mouth that balances at least in part the force applied to the patient's tooth or teeth by the tooth portion when the tooth portion is placed over one or more of the patient's teeth; where the anchorage portion of two sequentially applied dental appliances are configured to contact different portions of the patient's gingiva and/or palate.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

In some embodiments, the dental appliance for aligning a patient's teeth includes a palatal/gingiva contour anchorage (PCA) feature that substantially matches the shape of a portion of the patient's hard palate, soft palate, buccal gingiva, and/or lingual gingiva. This PCA feature is, when worn by the patient, designed to be built slightly off-set in order to deliberately push against the patient's hard palate, soft palate, buccal gingiva, and/or lingual gingiva to provide anchorage support of staged translation of the teeth, which can be in a vertical intrusion, vertical extrusion, mesial, buccal, lingual, and/or distal direction, for example. By transferring the required anchorage away from the teeth and onto the hard palate, soft palate, buccal gingiva, and/or lingual gingiva through the PCA feature, the adjacent teeth are no longer subjected to or are subjected to a reduced amount of unwanted side effects of reaction forces, thereby reducing the movement of teeth in unwanted directions.

In some embodiments, the dental application is an orthodontic alignment device for aligning the patient's teeth. The device may be an aligner, such as a clear shell aligner having a dentition-receiving cavity that can be placed over one or more of the patient's teeth. In addition, the device can include one or more PCA features. The dentition-receiving cavity is sized and shaped to fit over one or more teeth and to contact and exert a force against one or more predetermined surfaces of one or more of the patient's teeth when the dentition-receiving cavity is placed over the one or more of the patient's teeth. The PCA feature(s) can extend from the dentition receiving cavity and have a contour that matches a surface contour of at least one portion of the gingiva and/or palate within the patient's mouth. The hard palate, the soft palate, the buccal gingiva, and/or the lingual gingiva can be used to provide anchorage for the PCA feature.

When the device is worn over the teeth by the patient, the PCA feature exerts a reaction force on the at least one portion of the gingiva and/or palate within the patient's mouth that balances at least in part the force applied to the patient's tooth or teeth by the dentition-receiving cavity.

In general, the PCA feature may have a surface area sufficiently large to disperse the reaction force such that the PCA feature is configured to exert less than a predetermined amount of pressure against the gingiva and/or palate. The predetermined amount of pressure can be a pressure that causes pain, irritation or tissue damage, such as capillary damage, inflammation, desquamation, or necrosis, to the gingiva and/or palate within the patient's mouth.

In some embodiments, the pressure exerted by the PCT feature is less than about 90 MPa. In other embodiments, the pressure is less than about 5 to 90 MPa, or any value within this range. In some embodiments, at the lower end of the range (i.e., 5 MPa), the pressure can be exerted for up to 2 weeks on the palate before irritation or tissue damage occurs, while 90 MPa of pressure can quickly cause irritation or tissue damage. In some embodiments, the devices can have PCA features that distribute the loading on the gingiva and/or palate and exert pressures under the maximum threshold of 90 MPa. In some embodiments that exert between 5-90 MPa or less than 5-90 MPa, the location of the applied load to the palate and/or gingiva by the PCA feature can be changed periodically, such as between application of sequential devices, so that a particular location on the palate and/or gingiva does not experience a significant amount of pressure over a significant amount of time that may cause tissue irritation and/or damage.

In some embodiments, the applied pressure is selected to be below the pressure-pain threshold (PPT) of the patient. In some embodiments, the PPT is between about 200 to 1500 gram-force/square mm. In some embodiments, PCA features that use palatal sites can apply about 4 times greater levels of pressure than buccal sites before reaching the PPT threshold.

Figure 13:
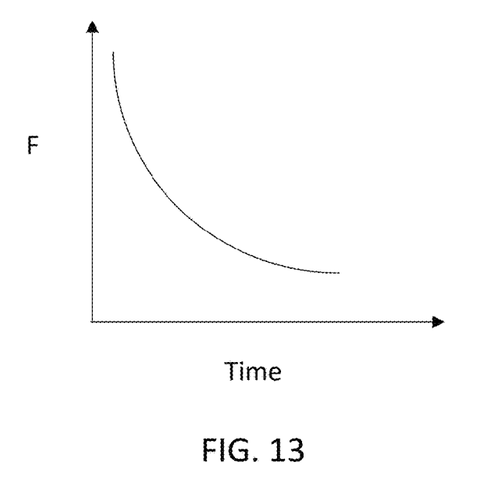
FIG. 13 is a graph that illustrates the relationship between force and time on the limits for tissue damage or irritation.

The limits for tissue damage and/or irritation, which is a function on the magnitude of the force/pressure and the duration that the force/pressure is applied, can be shown graphically, as shown in FIG. 13, by plotting the force/pressure applied by the PCA feature versus the time that the force/pressure is applied. As shown in FIG. 13, the higher the force/pressure applied, the shorter the time required before tissue damage and/or irritation occurs, and conversely, the lower the force/pressure applied, the longer the time required to cause tissue damage or irritation. Based on this force/pressure and time relationship, the frequency that the load application location on the palate and/or gingiva should be changed for a PCA feature that exerts a particular force/pressure can be determined. For example, for a device that exerts 5 MPa, the location of applied load should be changed at least every 2 weeks.

In some embodiments, the applied pressure is selected to be within the range of pressures exerted on the palatal tissue (e.g., the palatal crest, the mid-palatal area, the palatal area, the mandibular area, and the mandibular crest, for example) by dentures during various activities such as chewing food. In these embodiments, the pressure can be between about 4 and 350 kPa. For example, to extrude all the upper teeth, about 56 N of force is needed (4 N per tooth times 14 teeth). Using a PCA feature with a contact area of about 20 mm by 20 mm to apply 46 N of force results in about 130 kPa of pressure being applied to the contact area (assuming that all the force exerted by the PCA feature can be utilized for the extrusion), which is well within the range applied by dentures during use. Extruding fewer teeth using the same size contact area decreases the applied pressure, and decreasing the contact area of the PCA feature increases the pressure applied to the contact area for a given force. The size and location and orientation of the PCA contact area can be determined based on the calculated forces that are needed to perform the desired teeth movements and the target pressure (s) to be applied by the PCA feature.

Figure 1A:
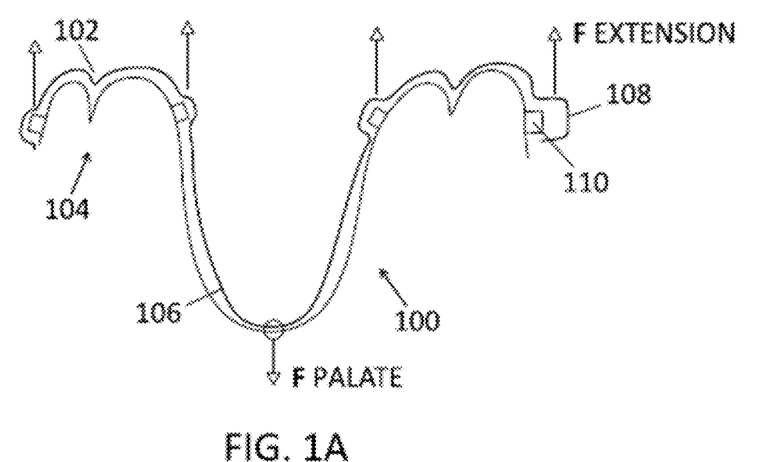
FIG. 1A illustrates a cross-sectional view of a dental appliance with (1) a teeth receiving portion having a dentition-receiving cavity and (2) a palatal/gingiva contour anchorage (PCA) feature that generates an extrusion force for extruding one or more teeth.

For example, FIG. 1A illustrates a cross-sectional of a dental appliance 100 with (1) a teeth receiving portion 102 having a dentition-receiving cavity 104 and (2) a PCA feature 106 that is shaped and sized to push against to patient's palate to generate an extrusion force that is directed in the opposite direction and that can be used to extrude one or more teeth. The dentition-receiving cavity 104 can have receptacles 108 for receiving tooth anchors 110 that can be affixed to the patient's teeth and that facilitate application of the extrusion force to the teeth. Alternatively or additionally, the dentition-receiving cavity 104 may be sized and shaped to fit over the tooth undercuts so that the teeth receiving portion 102 can transmit the extrusion force to the teeth via the undercuts. Without the PCA feature 106, the extrusion forces would need to be balanced by application of intrusive reaction forces to adjacent teeth.

Figure 1B:
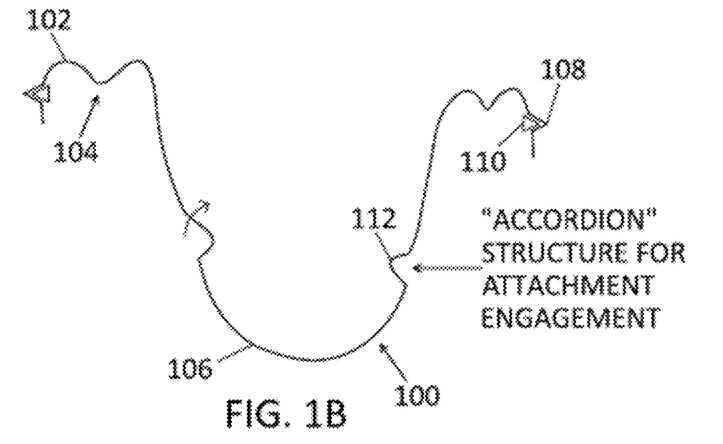
FIG. 1B illustrates a cross-sectional view of another embodiment of a dental appliance similar to the embodiment described above in connection with FIG. 1A but with an additional strain relief feature.

FIG. 1B illustrates an embodiment of a dental appliance 100 similar to the embodiment described above in connection with FIG. 1A. In the embodiment illustrated in FIG. 1B, the dental appliance further includes a strain relief feature 112 that can be positioned on the appliance between the teeth receiving portion 102 and the PCA feature 106. In some embodiments, the strain relief feature 112 can be an accordion-like or spring-like joint structure that can be slightly flexed, deformed and/or compressed. This slight flexure can be helpful during the initial insertion of the device by making it easier to properly seat the receptacles 108 over the anchors 110. In some embodiments, the strain relief feature 112 can be made of more elastic material than the rest of the appliance, and/or can be made thinner than the other portions of the appliance. In addition, the strain relief feature 112 can also function like a suspension to provide a safety mechanism that dampens high loads and helps evenly distribute the load over a desired portion of the palatal surface.

Figure 1C:
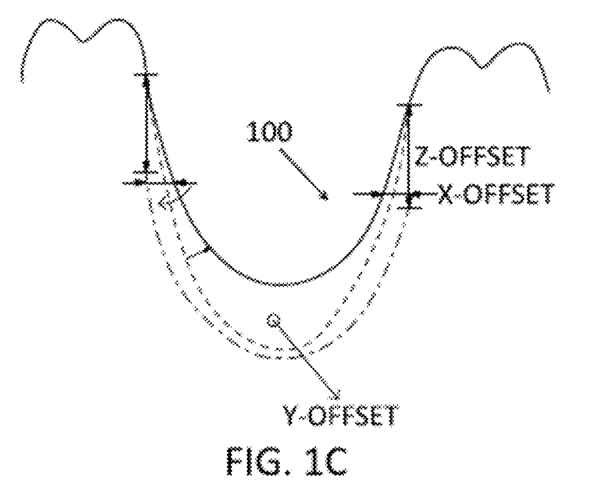
FIG. 1C is a cross-sectional view of the dental appliances shown in FIGS. 1A and 1B that illustrates how offsets in the x, y, and/or z axis are used to control the location of the palatal surface contact areas.

FIG. 1C is a cross-sectional view of the dental appliances 100 shown in FIGS. 1A and 1B that illustrates how offsets of the PCA feature 106 with respect to the palate in the X-axis, Y-axis, and/or Z-axis can be used to control the location of the palatal surface contact areas. For example, to perform a tooth extrusion as shown in FIGS. 1A and 1B, an offset in the vertical Z-axis of a portion of the PCA feature 106 can result in the offset portion exerting pressure on a corresponding region of the upper palate to serve as the anchorage, with increasing pressure applied to the palate with an increasing vertical offset. To specify and/or change the location on the palate that the vertical offset portion exerts pressure, an X-axis offset and/or Y-axis offset can be applied to Z-axis offset portion of the PCA feature when fabricating the next appliance in the series of appliances that are used to move the teeth. The X and Y offsets allows the anchorage location to be changed between successive appliances, which reduces the duration of force/pressure that is applied to a particular portion of the palate, thereby reducing the risk of irritation and or damage to the palatal tissues.

Figure 2:
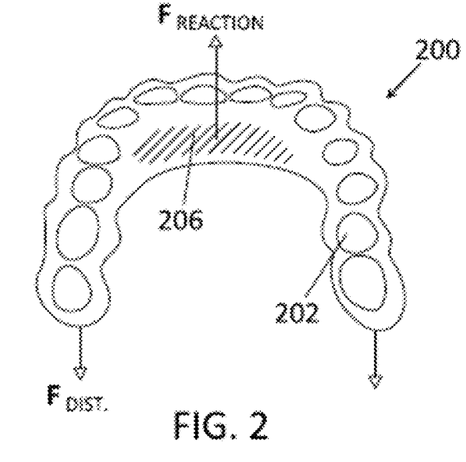
FIG. 2 illustrates an embodiment of a dental appliance with a teeth receiving portion and a PCA feature that generates a distalizing force for distalizing one or more teeth.

FIG. 2 illustrates an embodiment of a dental appliance 200 that can be applied to the maxilla and mandibular arch for distalizing a tooth. The dental appliance 200 can have a teeth receiving portion 202 and a PCA feature 206 that conforms to and exerts pressure against the anterior portion of the hard palate to generate a distalizing force that can be used to distalize one or more teeth, such as the molars. The teeth receiving portion can be sized and shaped to conform closely to the teeth to be moved so that the force can be effectively transmitted to the teeth. Alternatively or additionally, tooth anchors can be affixed to the teeth and receptacles for receiving the tooth anchors can be added to the teeth receiving portion 202 to help transmit the distalizing force to the teeth. Without the anterior PCA feature 206, the mesial reaction forces from moving the molars that were formerly transferred to the PCA feature 206 would instead be transferred to the adjacent molars.

Figure 3:
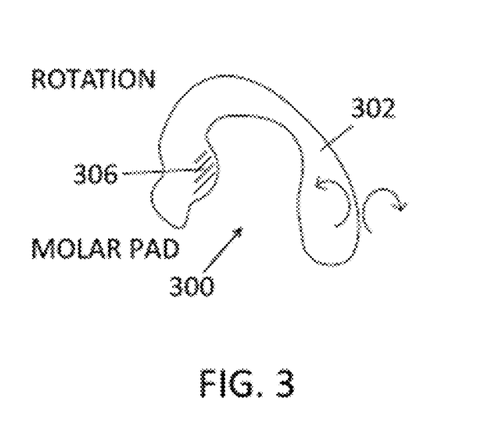
FIG. 3 illustrates an embodiment of another dental appliance 300 that can be applied to the maxilla and mandibular arch for rotating a tooth.

FIG. 3 illustrates an embodiment of a dental appliance 300 that can be applied to the maxilla and mandibular arch for rotating a tooth. The dental appliance can have a teeth receiving portion 302 and a PCA feature 306 that extends from the gingiva cut of the teeth receiving portion. The PCA feature 306 can conform to the lingual gingiva and serve to anchor a first order (z-rotation) reaction force that balances the first order rotational force that is applied by the teeth receiving portion 302 to rotate the tooth. Although the PCA feature 306 is shown conforming to the lingual gingiva, in some embodiments the PCA feature 306 can instead conform to the buccal gingiva to generate a rotation force in the opposite direction. This type of PCA feature may be referred herein generally as a tab or tab feature. As shown in FIG. 3, the PCA feature 306 extends from a part of the teeth receiving portion 302 that covers the molars, and therefore the PCA feature 306 may also be referred to as a molar pad.

Figure 4A:
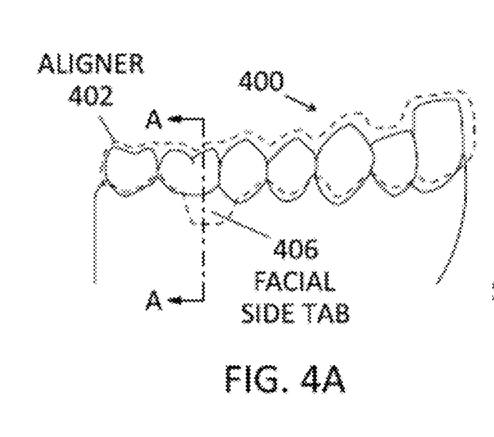
FIGS. 4A and 4B illustrate an embodiment of another dental appliance that can be applied to the maxilla and mandibular arch for rotating a tooth.
Figure 4B:
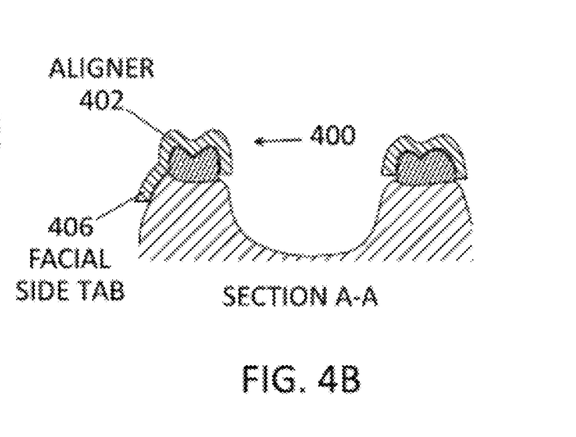

FIGS. 4A and 4B illustrate an embodiment of another dental appliance 400 that can be applied to the maxilla and mandibular arch for rotating a tooth. The dental appliance can have a teeth receiving portion 402 and a PCA feature 406 that extends from the gingiva cut of the teeth receiving portion. The PCA feature 406 can conform to the facial/buccal gingiva and serve to anchor a first order (z-rotation) reaction force that balances the first order rotational force that is applied by the teeth receiving portion 402 to rotate the tooth. The dental appliances illustrated in FIGS. 3 and 4A and 4B can be used to rotate a tooth in either direction.

Figure 5:
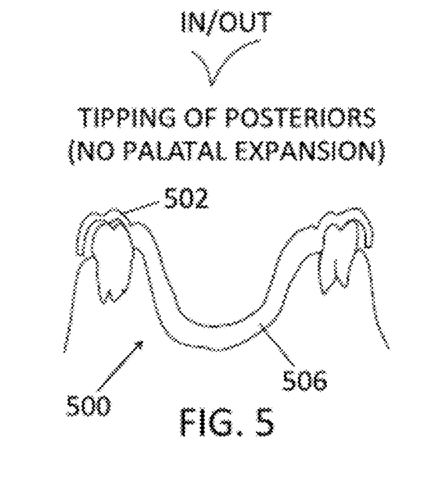
FIG. 5 illustrates a cross-sectional view of an embodiment of a dental appliance that can be used to tip teeth, particularly the posterior molars, inwards or outwards.

FIG. 5 illustrates a cross-sectional view of an embodiment of a dental appliance 500 that can be used to tip teeth, particularly the posterior molars, inwards or outwards. The dental appliance 500 can have a teeth receiving portion 502 and a PCA feature 506 that is sized and shaped to conform to the palate and/or lingual gingiva. In some embodiments, the PCA feature can push against the lateral aspects of the palate and/or lingual gingiva to generate an outwards and/or inwards force against the teeth for tipping the teeth outwards and/or inwards. In some embodiments, PCA feature does not apply a sufficient amount of force to the palate to result in palatal expansion.

Figure 6:
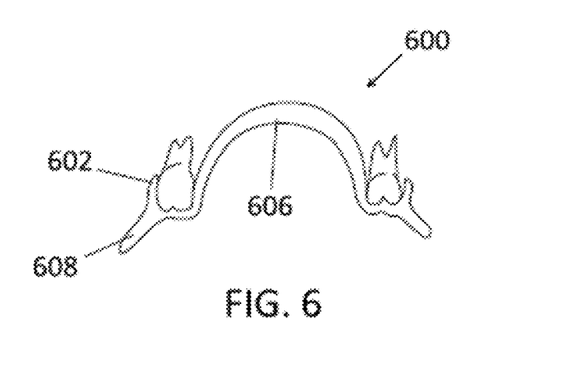
FIG. 6 illustrates an embodiment of a dental appliance that can be used for mandibular advancement/repositioning, such as moving the lower jaw or upper jaw forwards or backwards.

FIG. 6 illustrates an embodiment of a dental appliance 600 that can be used for mandibular advancement and/or repositioning, such as moving the lower jaw or upper jaw forwards or backwards. The dental appliance can have a teeth receiving portion 602 and a PCA feature 606, which in this case is a mandibular repositioning/advancement feature that can be sized and shaped to conform to the upper palate and/or lingual and/or buccal gingiva. The dental appliance 600 can also have a pair of wings 608 extending from opposing sides of the teeth receiving portion 602 that extends outwards and towards the lower jaw. The wings 608 can extend from a posterior portion of the teeth receiving portion 602 that receives the molars. A dental appliance can be worn over the lower dentition with a complementary pair of wings that extend outwards and towards the upper jaw. The appliance for the lower dentition can be an aligner with wings and optionally with PCA features that extend over the gingiva, as described herein. The dental appliance on the lower jaw can have PCA features that are shaped and sized to conform over the lingual and/or buccal gingiva. When the mouth is closed, the two pairs of wings lock together to force the lower jaw into a desired alignment with the upper jaw, such as moving the lower jaw forward. The PCA feature can help counteract and/or distribute the forces generated by the wings to the palate and/or gingiva instead of having all the forces applied to the teeth.

Figure 7:
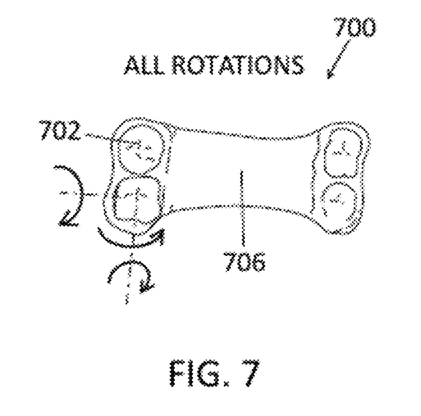
FIG. 7 illustrates an embodiment of a dental appliance that can be used to rotate teeth.

FIG. 7 illustrates an embodiment of a dental appliance 700 that can be used to rotate teeth. The dental appliance can have a teeth receiving portion 702 and a PCA feature 706 that conforms to at least a portion of the upper palate. As illustrated, the teeth receiving portion 702 only receives a pair of molars on each side, but in other embodiments, the teeth receiving portion 702 can receive fewer or more teeth or all the teeth in the upper jaw. The dental appliance 700 functions similar to the dental appliance 300 shown in FIG. 3, except that the PCA feature 706 extends to cover the palate rather than being a relatively small tab type feature. The PCA feature 706 can apply a similar force as the tab feature shown in FIG. 3 by having one or more discrete portions of the PCA feature 706 being offset from the natural contour of the gingiva and/or palate such that when worn, the offset portion pushes against the gingiva and/or palate to exert a force. This force can be used to balance the force needed to rotate a tooth.

Figure 8:
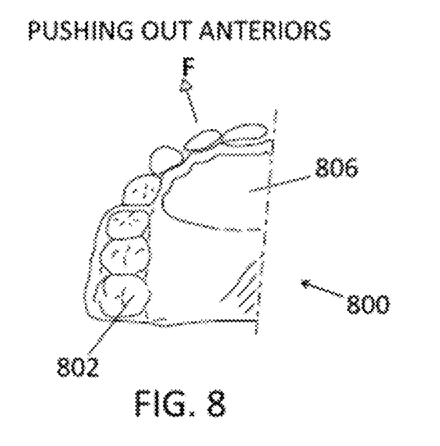
FIG. 8 illustrates an embodiment of a dental appliance that can be used to push the anterior teeth outwards by applying a force against the anterior portion of the hard palate.

FIG. 8 illustrates an embodiment of a dental appliance 800 that can be used to push the anterior teeth outwards by applying a force against the anterior portion of the hard palate. The dental appliance 800 can have a teeth receiving portion 802 that receives teeth, such as the molars, that serve as the anchorage, and a PCA feature 806 that is sized and shaped to conform to the palate and to exert a pressure against the anterior portion of the hard palate when the device is worn by the patient. As shown, the PCA feature 806 can cover both the hard palate and the soft palate, but in other embodiments as discuss below, only the hard palate may be covered.

Figure 9A:
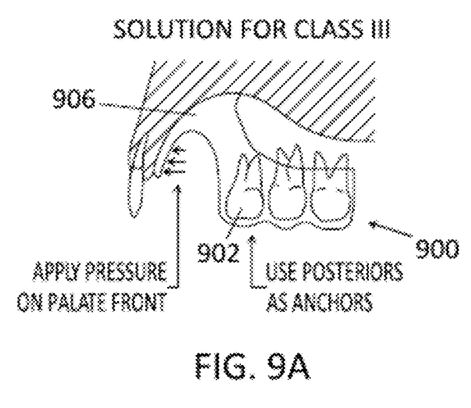
FIGS. 9A and 9B illustrate how one type of dental appliance can be used to create two different types of teeth movement depending on the specific configuration of the device.
Figure 9B:
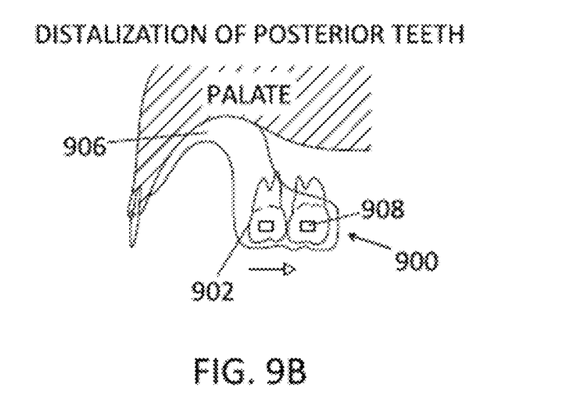

FIGS. 9A and 9B illustrate how one type of dental appliance 900 can be used to create two different types of teeth movement depending on the specific configuration of the device. The dental appliance 900 has a teeth receiving portion 902 and a PCA feature 906 that is sized and shaped to conform to and exert pressure against the hard palate, particularly the anterior portion of the hard palate. As shown in FIG. 9A, if a relatively large number of molars are received by the teeth receiving portion 902 to serve as anchors, the pressure applied by the PCA feature 906 can be used to push out the anterior teeth while resulting in no or minimal movement of the molars. Alternatively, as shown in FIG. 9B, if a relatively smaller number of teeth, such as molars, are received by the teeth receiving portion 902, the pressure applied by the PCA feature 906 against the anterior portion of the hard palate can be used to distalize the posterior teeth received by the teeth receiving portion 902. As shown in FIG. 9B, tooth anchors can be fastened to the teeth and corresponding tooth anchor receptacles 908 can be included in the teeth receiving portion 902 to improve transmission of force to the teeth and to improve the stability of the device on the teeth. Generally, the fewer teeth that are received by the teeth receiving portion 902, the greater the movement of the received teeth from the applied force. Conversely, using more teeth as anchors results in less teeth movement since the force is dispersed over a larger number of teeth, which reduces the force applied to each teeth individually.

Figure 10:
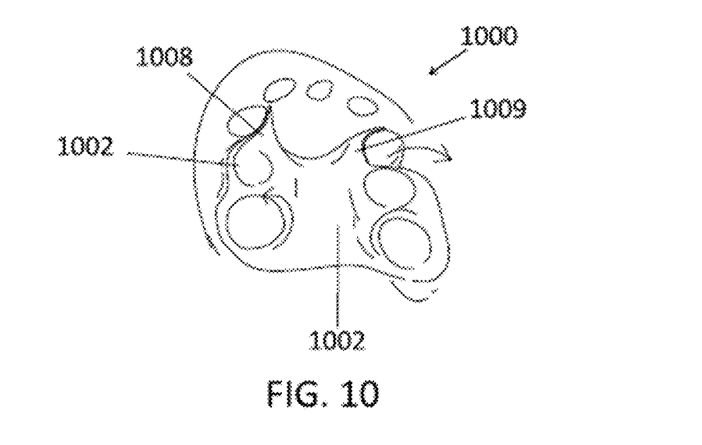
FIG. 10 illustrates another embodiment of a dental appliance that can be used to rotate teeth.

FIG. 10 illustrates an embodiment of a dental appliance 1000 that can be used to rotate teeth and is similar to the embodiment shown in FIG. 7 but with additional PCA features to provide additional leverage. The dental appliance 1000 can have a teeth receiving portion 1002 and a PCA feature 1006 that conforms to at least a portion of the upper palate. As illustrated, the teeth receiving portion 1002 only receives a pair of molars on each side, but in other embodiments, the teeth receiving portion 1002 can receive fewer or more teeth or all the teeth in the upper jaw. The dental appliance 1000 functions similar to the dental appliance 700 shown in FIG. 7, but with one or more additional PCA features 1008, 1009 that extend around additional adjacent teeth, such as the premolars. The additional PCA features 1008, 1009 can extend over the lingual gingiva around the adjacent teeth as shown and/or can extend over the buccal gingiva around the adjacent teeth and function to provide additional leverage to balance the forces applied to rotate the tooth.

All the different types of PCA features described herein can be used alone or in combination to achieve various types of teeth movements. Since the PCA features are low profile they generally do not interfere with the tongue and can be applied on the mandibular arch, the lingual or buccal gingiva, and the hard and soft palate. The application, placement, size and shape of the facial/buccal PCA features as wells as the other PCA features described herein can be varied and combined as needed to improve the prescribed treatment. For example, combining a facial PCA feature with a lingual PCA feature may be used to assist a first order or z axis rotation. The PCA features may be placed under the crown or in the interproximal (IP) region (i.e., space between the crowns) or a combination of the two. The size (i.e. surface area) and shape of the PCA features may be designed according to anchorage system needed, which may be symmetrical or asymmetrical.

These PCA features can work to enhance existing solutions used in dental appliances, such as attachments, lingual root torque (LRT), precision cuts, bite ramps, etc., or be designed as a stand-alone type of solution to minimize, reduce or eliminate the need to use existing solutions.

For example, the PCA features can be used as enhancements to existing aligner solutions to provide anchorage features for various segments of the aligner (i.e. extrusion anchorage features on the anterior segment of the aligner as shown in FIG. 2, for example).

In some embodiments, the aligner facial/buccal tab(s) can include a precision cut feature. In some embodiments, the aligner can include one or more tabs to minimize or reduce distortion of the aligner by adding anchorage to adjacent crowns that offload some of the forces from the aligner to the tabs.

LRT is used to generate a type of incisal inclination where the tooth rotates using the crown apex as the center of rotation (i.e., the root swings while the crown is static). LRT enhancements include minimizing aligner flaring/deformation and/or reducing the need for extreme aligner track activation by increasing aligner stiffness. Additional anchorage can be provided by the PCA features or by extending the aligner by adding material under the crown portion of the aligner so it doesn't flare out or deform. For example, the aligner can be trimmed longer so that the edge of the aligner extends past the gingival line.

Lower ridge placement can be achieved by adding material under the crown (i.e. extending the edge of the aligner past the gingival line), which may prevent cut off of a portion of the apparatus (e.g., inadvertently slicing the apparatus during the manufacture process if a portion is placed too close to the gingival line) so it doesn't need as large of a clearance from the gingiva line. By extending the length of the aligner past the gingival line and moving the trimming further away, the feature (i.e. a PCA feature) is less likely to be cut off by accident.

Adding anterior palatal contour anchorage under anterior bite ramps allows the bite forces to be distributed from the aligner to the PCA features which reduce unwanted aligner deformation.

Aligners with PCA features can function as a stand-alone aligner solution and can replace the use of attachments with aligners for patients that present with favorable conditions. As described herein, first order tooth rotations can be achieved using facial/buccal anchorage in combination with lingual anchorage to generate moments using the crown surface. Third order torques can be generated by strategically placing anchorage features to change aligner stiffness and combine with staging to influence the moment to force (M/F) ratios. For example, FIG. 7 illustrates support of mesial distal tipping control. Tooth extrusion can be achieved as described herein by using the anchorage features generate the appropriate reaction and extrusive forces and by adding rigidity to the aligner and using the crown undercuts and staging to achieve extrusive forces. As described herein, the M/F ratio is a biomechanical value which describes the type of 3D bodily motion an object will undergo upon the application of one or more forces. "Moment"=Moment of force=Torque=Force×Distance. Generally in the applications described herein, a M/F ratio of 0 results in bodily translation of the tooth, while a M/F ratio of 10, for example, results in crown tipping.

The PCA advantages include (1) anchorage is not from adjacent crowns, which minimizes or reduces unwanted aligner reaction forces on adjacent teeth; (2) can increase aligner stiffness in strategic directions, thereby improving aligner's ability to move tooth segments; (3) can be used to enhance existing aligner solutions and may be developed to minimize or replace them; (4) no metal and no manual tinkering of wires for fitting is required; (5) more comfortable, fully digital custom organic design; (6) ability to move teeth in ways beyond rapid palatal expander expansion; (7) PCA is able to be staged in small precise increments; and (8) PCA offset calibrated to mitigate tissue damage.

Device Fabrication

The design and fabrication process of the custom features specific for each patent provides dynamic flexibility to change the feature locations, sizes and shapes at specified stages in the treatment. For example, the process allows (1) shifting/moving the anchorage location during treatment to reduce the time that soft tissue is in contact with the aligner to minimize irritation; and/or (2) changing the anchorage location, shape and/or size to adjust (in terms of force or pressure) to changes in the arch during treatment. Suitable fabrication processes include additive manufacturing process, one piece thermoform, one piece direct print fabrication, two piece snap-in lock, two piece sonic weld, and two piece adhesive bond.

Figure 11:
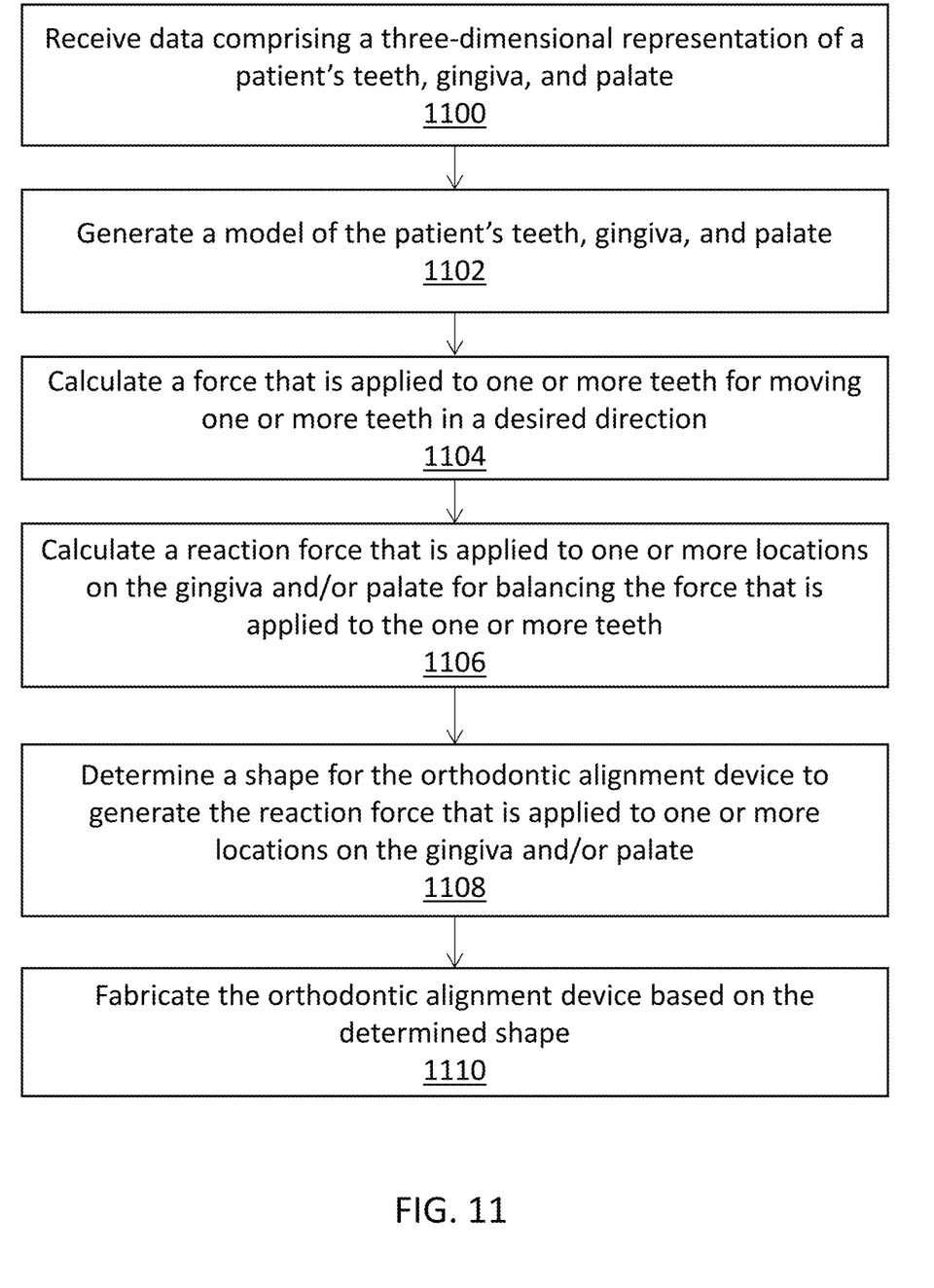
FIG. 11 is a flow chart that illustrates a computer implemented method for fabricating a dental appliance.
Figure 14:
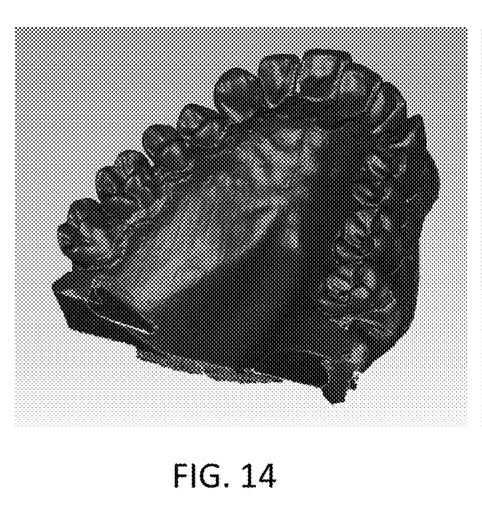
FIG. 14 is a digital model of a patient's palate and dentition that is constructed by digitally scanning the patient's palate and dentition.

FIG. 11 is a flow chart that illustrates a computer implemented method for fabricating a dental appliance. The method can be implemented on a computer having a processor, memory, and software that is programmed to implement the following steps. In step 1100, the method begins by receiving data comprising a three-dimensional representation of a patient's teeth, gingiva, and palate within the patient's mouth. For example, the patient's dentition and palate can be digitally scanned and imaged, and the resulting data can be sent to the computer, as shown in FIG. 14. In step 1102, a model of the patient's teeth, gingiva, and palate within the patient's mouth is generated using the received data. In step 1104, the force that is applied to the teeth for moving the teeth in a desired direction and amount is calculated. In step 1106, the reaction force that is applied to one or more locations on the gingiva and/or palate within the patient's mouth for balancing the force that is applied to the one or more teeth is calculated. In step 1108, the shape for the orthodontic alignment device is determined based on the generated model of the patient's teeth, gingiva, and palate, the calculated force that is applied to the teeth, and the calculated reaction force that is applied to one or more locations on the gingiva and/or palate. In step 1110, the orthodontic alignment device is fabricated based on the determined shape.

Figure 12:
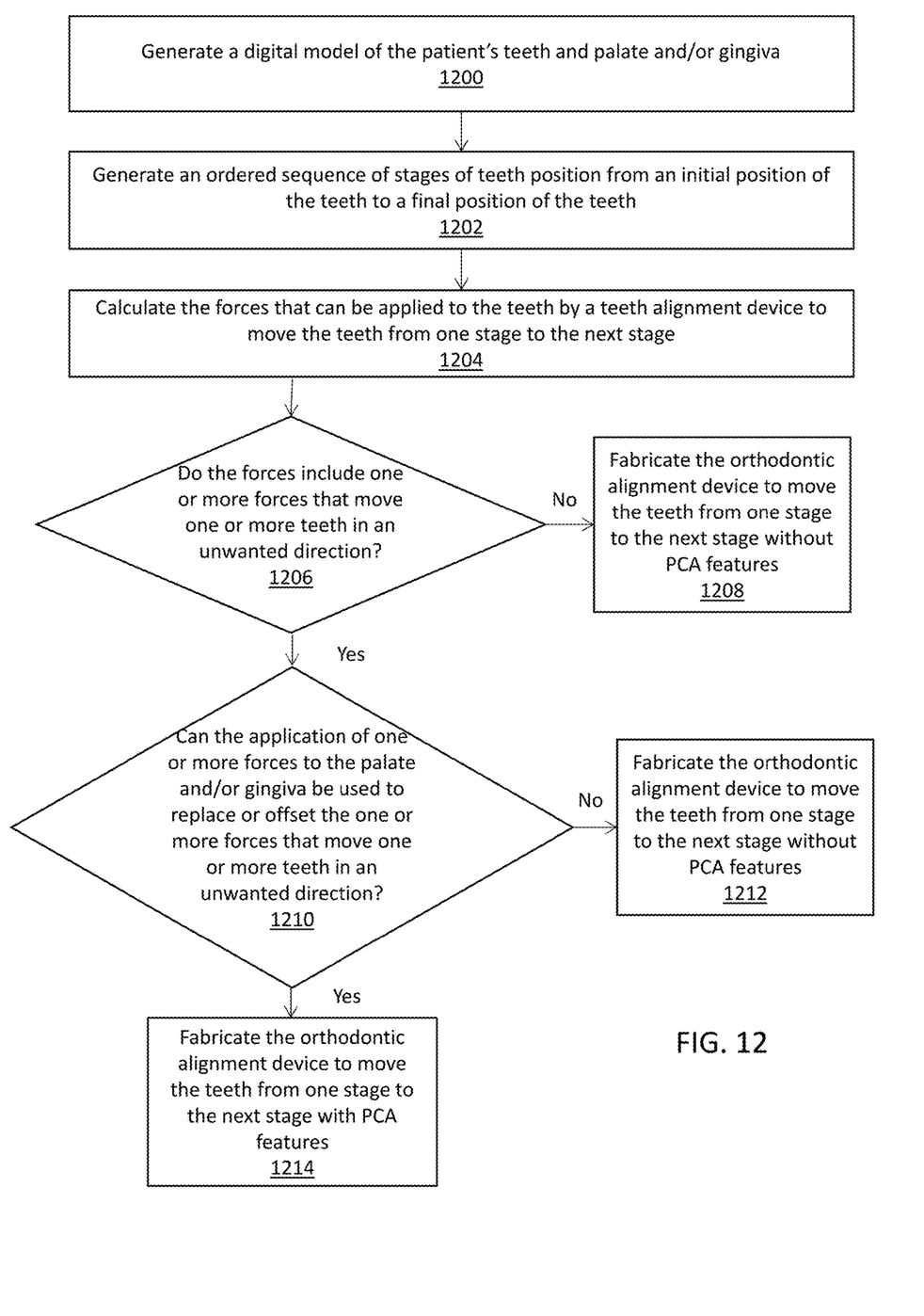
FIG. 12 is a flow chart that illustrates another computer implemented method for fabricating a dental appliance.
Figure 15:
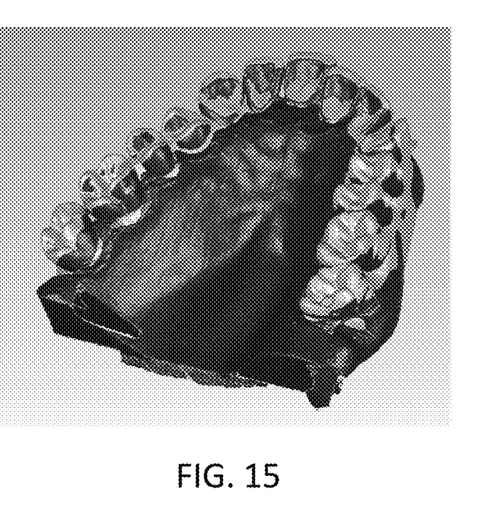
FIG. 15 illustrates that the movement of teeth are staged while keeping the palatal geometry static.

FIG. 12 is a flow chart that illustrates another computer implemented method for fabricating a dental appliance. The method begins in step 1200 by generating a digital model of the patient's teeth and palate and/or gingiva, where each tooth is a separate object that can be independently moved in the digital model and where the palate and/or gingiva is also a separate object that may be independently moved. As above, the patient's dentition and palate can be digitally scanned and imaged, and the resulting data can be sent to the computer, as shown in FIG. 14. In step 1202, an ordered sequence of stages of teeth position is generated while keeping the palatal geometry static, as shown in FIG. 15, where the ordered sequence of stages includes a stage for an initial position of the teeth, a plurality of stages for a plurality of intermediate positions of the teeth, and a stage for a final position of the teeth. In step 1204, the forces that can be applied to the teeth by a teeth alignment device to move the teeth from one stage to the next stage are calculated. In step 1206, the method checks whether the forces include one or more forces that move one or more teeth in an unwanted direction. If no, the method proceeds to step 1208 to fabricate the orthodontic alignment device to move the teeth from one stage to the next stage without any PCA features. If yes, the method proceeds to step 1210 and checks whether the application of one or more forces to the palate and/or gingiva be used to replace or offset the one or more forces that move one or more teeth in an unwanted direction. If no, the method proceeds to step 1212 to fabricate the orthodontic alignment device to move the teeth from one stage to the next stage without any PCA features. If yes, the method proceeds to step 1214 to fabricate the orthodontic alignment device to move the teeth from one stage to the next stage with PCA features.

The methods describe above can further include calculating a level of pressure applied to the palate and/or gingiva by the PCA features when worn by the patient, and modifying the size and/or shape of the PCA features when the determined level of pressure applied to the palate and/or gingiva exceeds a set or predetermined level. The modified size and/or shape of the orthodontic alignment device can reduce the level of pressure applied to the palate and/or gingiva below the set or predetermined level.

In general, the software workflow for fabrication can be broken down into seven steps: (1) segment the teeth and palate individually; (2) stage the teeth to move; (3) assess the force/moment needed to move each tooth; (4) determine if palatal staging is needed; (5) compute the force/moment delivered on each tooth; (6) vary the design of the appliance; and (7) build the appliance.

(1) Segment the teeth and palate individually: the patient's teeth can be separate objects that are capable of individual independent movements. The patient's full upper palate can be a separate object as well.

(2) Stage the teeth to move: the patient's teeth are staged according to the desired treatment plan.

(3) Assess the force/moment needed to move each tooth as planned in previous step: A phenomenological model based orthodontic experience can be used to determine the forces that should be applied to the tooth in order to move the tooth in the desired direction using the formula: $(Fx, Fy, Fz, Mx, My, Mz)=f(Tx, Ty, Tz, Rx, Ry, Rz)$, where F=force (typically in Newtons), M=moment (typically in Newton-millimeters, T=translation axis (typically staged in millimeters), and R=rotational axis (typically staged in degrees). Physical simulations can be performed using finite element analysis (FEA), for example.

(4) Determine if palatal staging is needed: consider if the sum of force or moment needed for staged teeth movement has an unbalanced force system, one that might generate unwanted side effects, and if the movement would benefit from palatal anchorage support.

(5) Compute the force/moment delivered on each tooth by the appliance, as a function of: amount of activation applied to each tooth and localized pressure applied to the palate or gingiva by modification of the appliance to include PCA feature(s). Forces may be determined using a computational model of the aligner based on FEA, for example, or according to the methods described in U.S. Pat. No. 9,375,300, which is hereby incorporated by reference in its entirety.

(6) Vary the design of the appliance, by changing: amount of activation, location and amount of pressure applied to the palate and/or gingiva. Ensure that the pressure applied is within the safety limits and falls within tolerances to avoid harming tissues. Ideally, forces are distributed across the palate and/or gingiva over a large enough area to ensure minimum risk of patient discomfort.

(7) Build appliance: apply the shape of the palate onto each stage of the treatment case and build the appliances.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for fabricating an orthodontic alignment device, the method comprising:
   generating a digital model having teeth and a palate representing teeth and a palate of a patient's mouth, wherein each tooth of the digital model is a separate object that can be independently moved in the digital model;
   generating an ordered sequence of stages each comprising corresponding teeth position;
   applying a first plurality of forces to the teeth of the digital model to simulate movement of the teeth of the digital model from one stage of the ordered sequence of stages to a next stage of the ordered sequence of stages;
   determining that the first plurality of forces includes one or more unwanted forces that move one or more teeth of the digital model in an unwanted direction;
   applying one or more forces to the palate of the digital model that results in a second plurality of forces applied to the teeth of the digital model to replace or offset the one or more unwanted forces;
   determining a shape for the orthodontic alignment device based on the first and second plurality of forces applied to the teeth of the digital model and in combination with the one or more forces applied to the palate of the digital model; and
   fabricating the orthodontic alignment device based on the determined shape, wherein the fabricated orthodontic alignment is configured to move the teeth of the patient's mouth from the one stage to the next stage.

2. The method of claim 1, further comprising determining a level of pressure applied to the palate of the digital model when the orthodontic alignment device is worn by the patient.

3. The method of claim 2, further comprising modifying the shape of the orthodontic alignment device when the determined level of pressure applied to the palate of the digital model exceeds a set or predetermined level, wherein the modified shape of the orthodontic alignment device reduces the level of pressure applied to the palate of the digital model below the set or predetermined level.

4. The method of claim 3, wherein modifying the shape of the orthodontic alignment device includes increasing a size of a portion of the orthodontic alignment device configured to contact the palate of the patient's mouth.

5. The method of claim 1, further comprising fabricating a series of orthodontic alignment devices to sequentially move the teeth of the patient's mouth from a stage for an initial position of the teeth to a stage for a final position of the teeth according to the ordered sequence of stages.

6. The method of claim 1, wherein the palate of the digital model is an object separate from each of the teeth of the digital model.

7. The method of claim 1, wherein the ordered sequence of stages includes a stage for an initial position of the teeth of the patient's mouth, a plurality of stages for a plurality of intermediate positions of the teeth of the patient's mouth, and a stage for a final position of the teeth of the patient's mouth.

8. The method of claim 1, wherein determining the shape for the orthodontic alignment device comprises forming a digital offset portion having an offset shape with respect to at least a portion of a surface contour of the palate of the digital model, wherein the digital offset portion applies the one or more forces to the palate of the digital model.

9. The method of claim 8, wherein the offset shape is configured to exert a reaction force on an anterior portion of a hard palate of the patient to generate a distalizing force against one or more molars of the teeth of the patient or to push one or more anterior teeth of the teeth of the patient outward.

10. A method for fabricating an orthodontic alignment device, comprising:
generating a treatment plan using a digital model having teeth and a palate and/or a gingiva representing teeth and a palate and/or a gingiva of a patient, wherein the treatment plan includes an ordered sequence of stages each associated with corresponding teeth positions;
applying a first plurality of forces to the teeth of the digital model to simulate movement of the teeth of the digital model from one stage of the ordered sequence of stages to a next stage of the ordered sequence of stages;
determining that the first plurality of forces includes one or more unwanted forces that move one or more of the teeth of the digital model in an unwanted direction;
applying one or more forces to the palate and/or the gingiva of the digital model that results in application of a second plurality of forces on the teeth of the digital model to replace or offset the one or more unwanted forces;
determining a shape for the orthodontic alignment device based on applying the first and second plurality of forces to the teeth of the digital model in combination with the one or more forces applied to the palate and/or the gingiva of the digital model; and
fabricating the orthodontic alignment device based on the determined shape, wherein the fabricated orthodontic alignment is configured to move the teeth of the patient from the one stage to the next stage.

11. The method of claim 10, further comprising segmenting the digital model of the teeth and the palate and/or the gingiva of the digital model such that each tooth of the digital model is a separate object that can be independently moved in the digital model.

12. The method of claim 10, further comprising determining a level of pressure applied to the palate and/or the gingiva of the digital model.

13. The method of claim 12, further comprising determining that the level of pressure exceeds a predetermined level and modifying the shape of the orthodontic alignment device to reduce the level of pressure.

14. The method of claim 13, wherein modifying the shape of the orthodontic alignment device includes increasing a size of a portion of the orthodontic alignment device configured to contact the palate and/or the gingiva of the patient.

15. The method of claim 10, wherein the ordered sequence of stages includes a stage for an initial position of the teeth of the patient, a plurality of stages for a plurality of intermediate positions of the teeth of the patient, and a stage for a final position of the teeth of the patient.

16. The method of claim 15, further comprising determining a shape for each of a plurality of orthodontic alignment devices corresponding to each of the ordered sequence of stages.

17. The method of claim 10, wherein determining the shape for the orthodontic alignment device comprises forming a digital offset portion having an offset shape with respect to at least a portion of a surface contour of the palate and/or the gingiva of the digital model, wherein the digital offset portion applies the one or more forces to the palate and/or the gingiva of the digital model.

18. The method of claim 17, wherein the offset shape is configured to exert a reaction force on an anterior portion of a hard palate of the patient to generate a distalizing force against one or more molars of the teeth of the patient or to push one or more anterior teeth of the teeth of the patient outward.

19. A method for fabricating an orthodontic alignment device, comprising:
generating a treatment plan using a digital model having teeth and a palate and/or a gingiva representing teeth and a palate and/or a gingiva of a patient, wherein the treatment plan includes an ordered sequence of stages each associated with corresponding teeth positions;
applying a first plurality of forces to the teeth of the digital model to simulate movement of the teeth of the digital model from one stage of the ordered sequence of stages to a next stage the ordered sequence of stages;
determining that the first plurality of forces includes one or more unwanted forces that move one or more of the teeth of the digital model in an unwanted direction;
applying one or more forces to the palate and/or the gingiva of the digital model that results in application of a second plurality of forces on the teeth of the digital model to replace or offset the one or more unwanted forces;
determining a shape for the orthodontic alignment device based on applying the first and second plurality of forces to the teeth of the digital model in combination with the one or more forces applied to the palate and/or the gingiva of the digital model, wherein determining the shape comprises determining an offset portion of the orthodontic alignment device for applying the one or more forces to the palate and/or the gingiva of the digital model, the offset portion having an offset shape with respect to at least a portion of a surface contour of the palate and/or the gingiva of the digital model; and
fabricating the orthodontic alignment device based on the determined shape, wherein the fabricated orthodontic alignment is configured to move the teeth of the patient from the one stage to the next stage.

20. The method of claim 19, wherein the offset shape is configured to exert a reaction force on an anterior portion of a hard palate of the patient to generate a distalizing force against one or more molars of the teeth of the patient or to push one or more anterior teeth of the teeth of the patient outward.

* * * * *